Jan. 15, 1963　　　M. G. BECK　　　3,073,620
SPRING SUSPENSION
Filed Sept. 1, 1960

INVENTOR.
Merrill G. Beck
BY
Ralph Hammar
Attorney

United States Patent Office 3,073,620
Patented Jan. 15, 1963

3,073,620
SPRING SUSPENSION
Merrill G. Beck, Erie, Pa., assignor to Lord Manufacturing Company, Erie, Pa., a corporation of Pennsylvania
Filed Sept. 1, 1960, Ser. No. 53,479
2 Claims. (Cl. 280—124)

This invention is intended to eliminate or reduce wheel reverse camber due to axle bending. This is accomplished by a spring suspension supplying a torque which tends to cancel the axle bending torque due to load.

Figure 1:
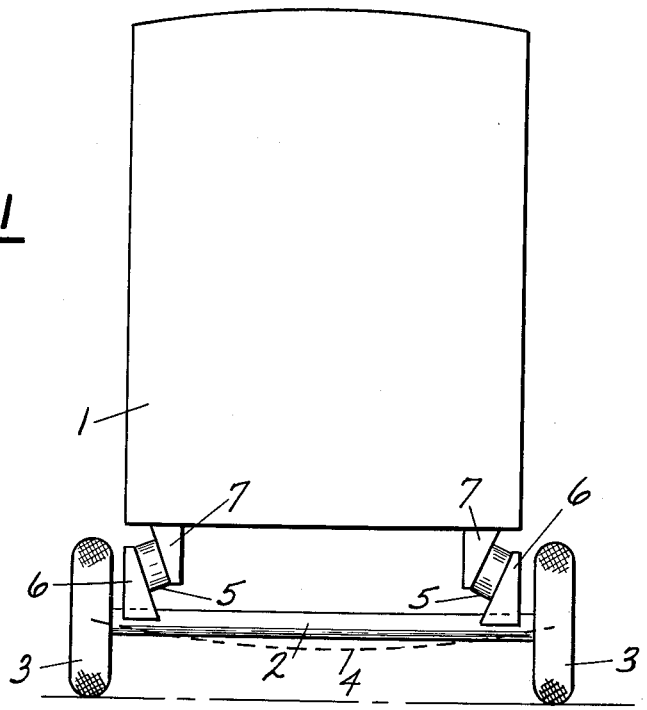
Figure 2:
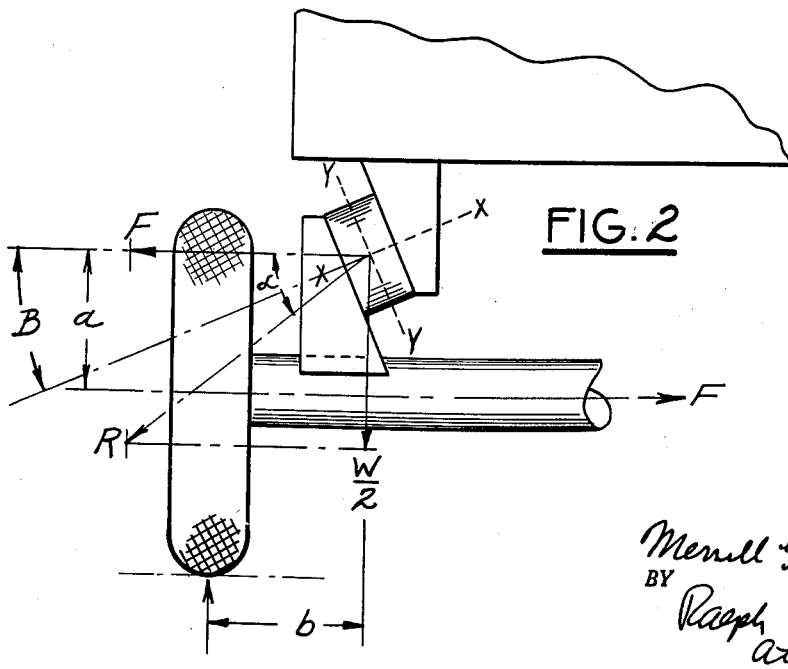

In the drawing, FIG. 1 is a rear view of a trailer axle and FIG. 2 is a diagrammatic view of the spring system and of the forces.

With the conventional spring system, the weight W of the trailer 1 is transmitted in equal parts through a spring suspension connected to the axle 2 at points spaced inward from wheels 3 thereby causing the axle to bow downward at the center as indicated by dotted line 4. This causes wheels 3 to tip inwardly at the top producing a reverse wheel camber resulting in poor tracking and excessive tire wear.

With the present invention, the springs are above the axle and inclined to develop both horizontal and vertical forces. The vertical forces sustain the load and the horizontal forces create an upward bowing tendency of the axle which counteracts the downward bowing tendency due to the vertical loads. Thus the reverse wheel camber is eliminated or at least reduced.

Each spring is a shear sandwich of a body 5 of rubber or like elastomer having opposite faces bonded to a bracket 6 fixed to the axle and a bracket 7 fixed to the trailer body. The spring is stiffest along axis XX, the compression direction, and softest along axis YY, the shear direction. The trailer load W produces at each spring a downward force $$\frac{W}{2}$$

and a horizontal force F. When the torque $$\frac{W(b)}{2} \text{ equals } F(a)$$

the resultant force R acts through the center of the wheel and there is no tendency to deflect the axle. This completely eliminates reverse wheel camber. The forces $$\frac{W}{2}$$

and F are proportional to the trailer load so the improvement is independent of the load. The torque F(a) is in the direction to substract from the torque $$\frac{W(b)}{2}$$

so that improvement is obtained when F(a) is less than $$\frac{W(b)}{2}$$

There are other important advantages besides minimizing axle bending. One is that the virtual center of the suspension system is above the mounting plane; thus there is less tendency for the load to roll sideways from side thrust forces such as rounding corners, travelling crowned roads, etc. Another advantage is the ease of obtaining a progressively increasing spring rate with an increasing load, if it is desired, for a wide range of loads. Another advantage is the added safety in the load being supported even if the spring should fail.

The spring system is applicable to all types of axles. Radius and torque rods can be incorporated on the axle also as required for longitudinal axle positioning.

From one aspect, the angling of the mountings moves the effective points of attachment of the springs toward the outer ends of the axle. Ideally, the springs should be attached to the axle at the centers of the wheels. This condition is realized when the resultants of the horizontal and vertical forces pass through the centers of the wheels as illustrated in FIG. 2. Then the axle bending forces are completely neutralized independent of load. This requires that the axis X—X of greatest stiffness pass above the center of the wheel.

The conditions for complete neutralizing of bending forces are expressed by the equation:

$$\frac{\cos^2 B + L \sin^2 B}{\sin B \cos B(L-1)} = \tan \alpha - \frac{a}{b}$$

Where L is the ratio of compression stiffness (along X—X) to shear stiffness (along Y—Y) of the mountings and the other terms are as indicated in FIG. 2.

What is claimed as new is:

1. A vehicle spring suspension comprising an axle with a wheel at each end, a load, a spring between the load and each end of the axle, each spring being spaced inward from its end of the axle and above the axle and said springs being stiffest along axes passing above the centers of the wheels and inclined toward each other and converging above the springs, and load transmitting connections from the load to the springs and from the springs to the axle transmitting forces to the axle along said axes whereby the load produces horizontal outward forces above the axle producing a bending moment tending to counteract the downward bowing of the axle under the load.

2. A vehicle spring suspension comprising an axle with a wheel at each end, a load, a shear sandwich mounting in load carrying relation between the load and each end of the axle, each mounting comprising a body of an elastomer between and fixed to spaced brackets, said mountings being spaced inward from each end of the axle above the axle and being stiffest along axes passing above the centers of the wheels and inclined toward each other and converging above the springs whereby the load produces horizontal outward forces above the axle producing a bending moment tending to counteract the downward bowing of the axle under the load.

References Cited in the file of this patent

UNITED STATES PATENTS

| 1,260,131 | Benner | Mar. 19, 1918 |
| 1,287,917 | Dottl | Dec. 17, 1918 |
| 1,416,469 | Hupp | May 16, 1922 |
| 2,828,958 | Hirst | Apr. 1, 1958 |